United States Patent
Gao et al.

(10) Patent No.: US 7,283,677 B2
(45) Date of Patent: Oct. 16, 2007

(54) MEASURING SUB-WAVELENGTH DISPLACEMENTS

(75) Inventors: Jun Gao, Mountain View, CA (US); Carl E. Picciotto, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 654 days.

(21) Appl. No.: 10/931,647

(22) Filed: Aug. 31, 2004

(65) Prior Publication Data

US 2006/0045314 A1    Mar. 2, 2006

(51) Int. Cl.
*G06K 9/46* (2006.01)

(52) U.S. Cl. .................... 382/250; 427/248.1; 428/328

(58) Field of Classification Search ................ 382/250; 428/328; 427/248.1
See application file for complete search history.

(56) References Cited

U.S. PATENT DOCUMENTS

| 4,805,123 | A | 2/1989 | Specht et al. |
| 5,548,326 | A | 8/1996 | Michael et al. |
| 6,546,120 | B1 | 4/2003 | Etoh et al. |
| 2002/0179819 | A1 * | 12/2002 | Nahum .................... 250/208.1 |
| 2004/0085540 | A1 * | 5/2004 | Lapotko et al. ............. 356/432 |
| 2006/0012798 | A1 * | 1/2006 | Jones et al. ................. 356/512 |

FOREIGN PATENT DOCUMENTS

| EP | 0659021 | 6/1995 |
| EP | 0999521 | 5/2000 |
| WO | WO 02/097535 | 12/2002 |

* cited by examiner

*Primary Examiner*—Matthew C. Bella
*Assistant Examiner*—Mike Rahmjoo

(57) ABSTRACT

Measurement systems and methods extend the use of optical navigation to measure displacements smaller than a wavelength of the light used to capture images of an object measured. Nanometer-scale movements can thus be measured, for example, in equipment used for manufacture of integrated circuits or nanometer scale devices.

12 Claims, 2 Drawing Sheets

MEASURING SUB-WAVELENGTH DISPLACEMENTS

BACKGROUND

Optical navigation or more generally displacement sensing and estimation permits measurement of displacements through the use of image cross-correlations. One known displacement measurement technique involves acquiring displaced images of an object or a web on the surface of the object, correlating the images with respect to one another, and deriving a translation vector based on a maximum likelihood formulation. One may acquire displaced images in a variety of ways, including taking time-separated acquisitions when the object, camera, or both are moving; taking images with multiple cameras that are offset from one another; or some combination involving motion and multiple cameras.

Systems that correlate displaced images and generate displacement estimates have been used with success in devices such as optical mice for control of cursor movement according to measured displacements relative to underlying surfaces. However, such displacement measurement techniques have not been thought suitable for applications where the required accuracy of the displacement measurement may be less than the wavelength used in imaging.

Known systems for precision alignment or measurement of small displacements have a number of common drawbacks. In particular, such systems are generally complex and expensive. Additionally, many such systems are inflexible in requirements, e.g., space and/or isolation requirements, making implementations awkward or impossible in many applications. Many measurement systems require specific patterns such as grating patterns to be laid-down on the object being measured to produce moire or diffraction patterns. Such patterns can be highly regular, so that spatial-uniqueness (or false matches) can become an issue. Also many precision measurement systems that are accurate at small dimensions are specifically designed for alignment sensing and cannot track movement or provide quantitative displacement information. Further, the systems that do provide quantitative displacement information are often unable to do so in real-time because of required scanning processes or significant post-processing.

Current measurement systems for precision tracking of a small object can be broadly categorized as being optical or non-optical measurement systems. An interferometer is one example of an optical measurement system that can precisely measure the position or velocity of an object by interfering or comparing a beam reflected from the object with a reference beam. Other optical interference based measurement systems are known that track object movement by measuring the movement of a diffraction patterns that a grating mounted on the object generates. Non-optical techniques are also available or proposed for tracking object movement. Examples of non-optical systems for precise measurements of small displacements include a Scanning Electron Microscope (SEM), an Atomic Force Microscope (AFM), or a capacitance sensing system.

An advantage of optical measurement systems generally when compared to the non-optical systems is the availability of precise and relatively inexpensive components such as beam sources and lenses. However, many optical measurement systems are limited to measurement accuracies that are greater than or about equal to the wavelength of the light used, and the wavelengths of visible light for which precision components are readily available are larger than the accuracies required for nanometer scale measurements. Optical systems for tracking movement with nanometer scale accuracies or accuracies shorter than visible light wavelengths are desired.

SUMMARY

In accordance with an aspect of the invention, a method for measuring a displacement of an object captures an image of the object (e.g., a reference frame) and then after a displacement captures a second image of the object (e.g., a comparison frame.) Correlation data representing a relationship between the images is generated and then fit to a continuous function. Identifying a location of an extremum of the continuous function can then measure the displacement to an accuracy less than a wavelength of light used to capture the images and/or to an accuracy less than the inherent resolution of the imaging system.

BRIEF DESCRIPTION OF THE DRAWINGS

Use of the same reference symbols in different figures indicates similar or identical items.

DETAILED DESCRIPTION

In accordance with an aspect of the invention, nanoscale displacement sensing and estimation (NDSE) process using conventional far-field imaging optics or microscopy can track movements of an object to a precision smaller than the pixel width and even smaller than the light wavelength used in imaging. Conceptually, sub-wavelength accuracies are possible based on image changes that result from a sub-pixel displacement. For example, if a bright object moves to the left, even by a sub-pixel amount, the pixels on a left border of an image brighten, and the pixels on the right border of the image dim. Collecting and processing a multitude of such pixel variations across an image array can generate an estimate for the extent of the object's movement. The concept of detecting such a tiny translation, as compared to the much wider point-spread function of the optical system, may be difficult to grasp, until one considers that an image can provide a very large number of pixels, and therefore tracking has available the translations of a multitude of object/point-spread function convolutions. As a result, the noise of tracking of a large number of micro-scale point-spread functions corresponding to nanometer-scale displacements is averaged out over a multitude of pixels, and hence over a multitude of regional object/point-spread function convolutions. The end result is extraordinary precision that can extend to distances shorter than the wavelength of the light used.

Figure 1:
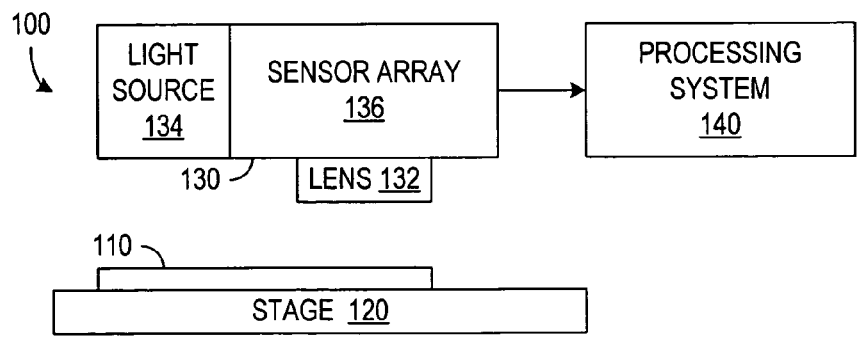
FIG. 1 is a block diagram of a measurement system in accordance with an embodiment of the invention.

FIG. 1 illustrates a measurement system 100 in accordance with an embodiment of the invention used to measure the movement of an object 110. Object 110 in an exemplary embodiment of the invention can be a wafer, a die, or any structure used in a manufacturing process of a nanometer-scale device. In FIG. 1, object 110 is mounted on a precision stage 120 that enables controlled movement of object 110. For example, stage 110 can be a N-point XY200Z20A-A nano-positioning stage available from nPoint Incorporated, which can be used to position a silicon die during processing.

An imaging system 130 captures images of object 110 and provides the images to a processing system 140 for analysis. Imaging system 130 can generally be any type of system capable of generating an image that can be divided into pixels corresponding to the portions of object 110 having a known size (or known sizes). Some specific implementations of imaging system 130 include video or still, digital or analog, color or black-and-white cameras. In the illustrated embodiment, imaging system 130 includes a lens 132, a light source 134, and a sensor array 136. Objective lens 132, which can be a microscope objective lens providing a magnification, is focused to form an image of object 110 on sensor array 136. Light source 134 illuminates object 110 during image capture and generally can be a conventional white light.

Sensor array 136, which can be a conventional CCD or CMOS sensor array captures and digitizes each image of object 110 for transmission to processing system 140. Generally, the image data from sensor array 136 is in the form of a pixel map containing pixel values, with each pixel value corresponding to an area of known size, e.g., 10 μm by 10 μm on object 110.

It is important to note that the effective pixel pitch (given by the physical pixel pitch multiplied by the magnification in the optics) need be no finer than that required to match the modulation transfer function (MTF) of the optics. For example, the effective pixel pitch may be set at maximum of one half of the breadth of the point-spread function of the optics, thus meeting the Nyquist sampling criterion and minimize unnecessary aliasing. Further, those familiar with sampling theory will understand that while there may be advantages to sampling to a finer degree than the Nyquist sampling criterion requires, resolving the image to a resolution finer than that resolved by the optical system is generally not possible. However, as described further below, measurements of sub-wavelength translations require neither resolving the image to sub-wavelength levels nor reconstructing the underlying features to sub-wavelength precision.

In one specific embodiment of imaging system 130, image sensor 136 is a monochrome digital camera such as the Pulnix TM-1400CL has a 1.4M pixels CCD that provides 8-bit pixel values, a pixel size of 4.65 μm in the image plane, and a maximum frame rate of 30 Hz. Lens 132 is a system of two alternative lenses such as Neo S Plan 20x/0.40 NA (Numerical Aperture) and 50x/0.80 NA available from Olympus, and light source 134 is a power regulated light source from Schott fitted with a standard broadband white light (e.g., a Phillips 150 W Focusline). Alternatively, a narrow band light source could reduce the chromatic aberration and hence allow for a better focus, resulting in a higher displacement resolution. However, measurement accuracies less than a pixel, e.g., less than 10 nm can be achieved using white light, so white light may be preferred for system simplicity and lower cost.

Processing system 140 analyzes the images from digital imaging system 130 and in particular executes an NDSE process that quantifies the displacement of object 110 from one image to the next. Processing system 140 can be implemented in any desired manner including but not limited to implementations as hardwired logic that performs the desired analysis or as a general-purpose computer executing software or firmware that performs the desired analysis.

Figure 2A:
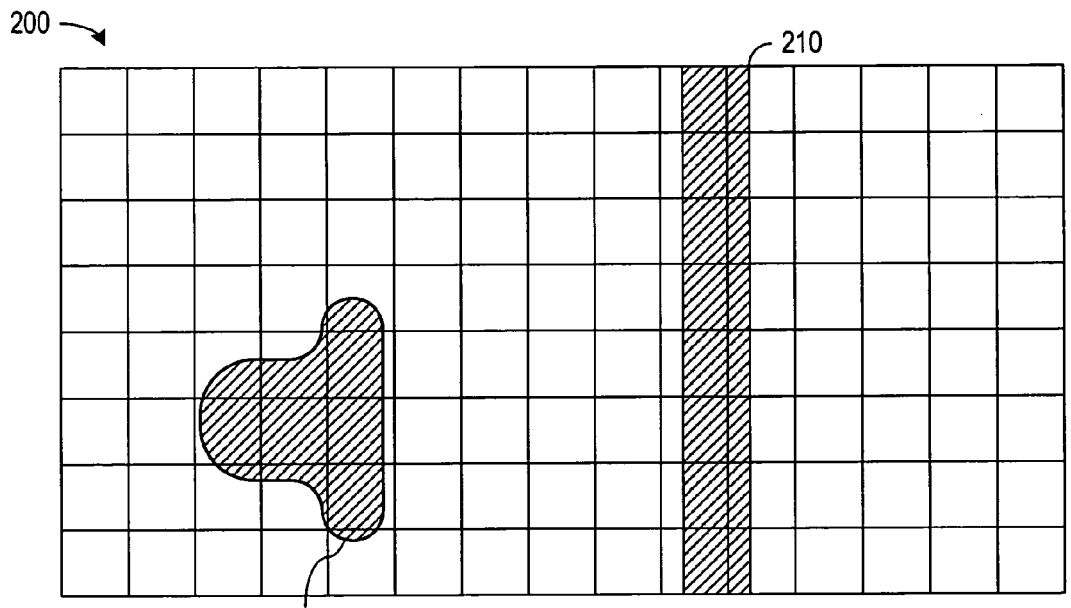
FIGS. 2A and 2B show unshifted and shifted images that an embodiment of the invention can use in a nanoscale displacement sensing and estimation process for tracking movement of an object.
Figure 2B:
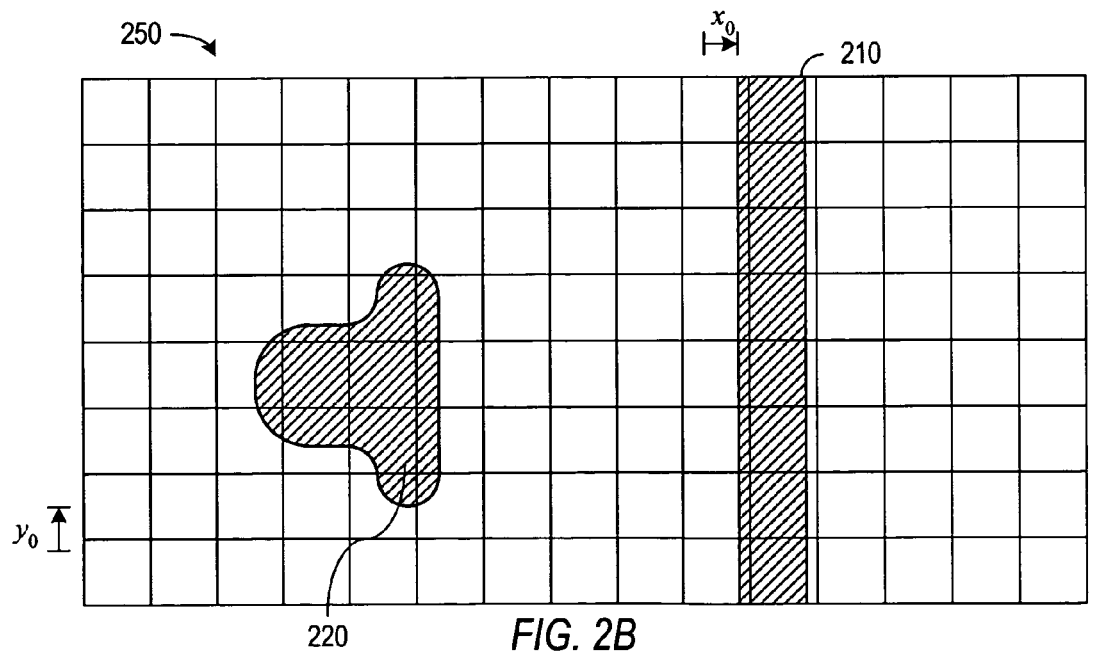

FIGS. 2A and 2B illustrate images 200 and 250 of an object respectively taken before and after the object and/or a camera moves. Both images 200 and 250 contain regions 210 and 220 that correspond to recognizable features on the object. Such features on the object include but are not limited to structures, markings, or discolorations on the object or an edge of the object. The features can be structures intentionally formed on the object for the purpose of measuring displacements, structures on the object that implement intended functions of the object, or random structures that just happen to be on the object. As described further below, displacement measurements do not require features 210 and 220 on the object to have predefined or known geometric shapes.

FIG. 2B shows features 210 and 220 that are shifted by displacements $x_0$ and $y_0$ respectively along x and y directions relative to the locations corresponding to features 210 and 220 in FIG. 2A. Grids overlying respective images 200 and 250 indicate how portions of images 200 and 250 can be mapped to pixels. Displacements $x_0$ and $y_0$ are generally not equal to an integer multiple of the pixel size, so that an area of the object corresponding to a single pixel in image 200 will generally form portions of multiple pixel values of array 250 and vice versa. Accordingly, when displacements $x_0$ and $y_0$ are fractions of a pixel, each pixel value corresponding to a pixel of image 250 will generally not have an exactly corresponding pixel value in a pixel map corresponding to image 200, but ignoring measurement errors, the pixel values in array 250 depend mathematically on the pixel values in array 200 and displacements $x_0$ and $y_0$.

Figure 3:
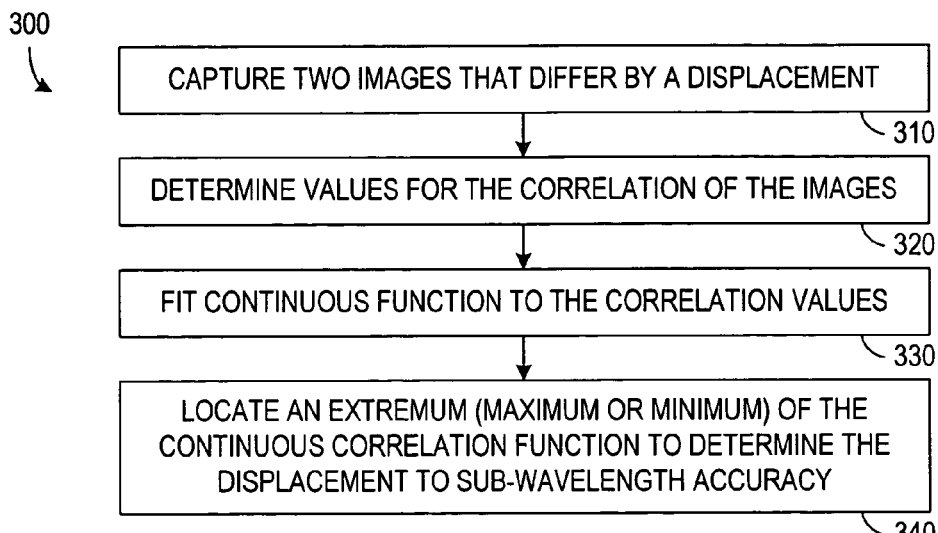
FIG. 3 shows a flow diagram for a measurement process in accordance with an embodiment of the invention.

FIG. 3 shows a flow diagram of a measurement process 300 in accordance with an embodiment of the invention. Process 300 can be performed by a processing system such as processing system 140 of FIG. 1, and one embodiment of the invention is a computer-readable storage medium such as a floppy disk, a CD, a DVD, or a memory device containing a set of instructions or routines that implements process 300. Process 300 begins in step 310 with acquisition of images of an object before and after a displacement. The two images may, for example, be acquired using imaging system 130 of FIG. 1, which provides the images as an array of pixel values. Step 320 then determines values of a correlation of the two images. The correlation represents a relationship such as a coincidence of matching in the two image. The correlation values can be calculated from the pixel values of the images and generally correspond to discrete values indexed in substantially the same manner as the pixels. Step 330 fits a continuous surface to the determined correlation values from step 320, before step 340 locates an extremum (i.e., a maximum or minimum) of the continuous surface. The coordinates or location of the extremum will generally be a real value identifying the displacement that provides the best correlation of the images.

A variety of methods for determining a correlation of the two images and then identifying the displacement that provides the best correlation could be used in process 300. However, in accordance with a further aspect of the invention, a nearest neighbor navigation (N-cubed) process can provide accurate displacement determinations down to or less than 1% of a pixel width. For an imaging system suitable for integrated circuit or nano-device manufacturing, the resulting displacement resolution can be less than the wavelength of light used for image capture.

An exemplary embodiment of the N-cubed process uses a correlation $C_{i,j}^k$ that is a nonzero-mean difference-detection function as indicated in Equation 1. In Equation 1, $r_{m,n}$ represents a pixel value from the M×N reference frame array (i.e., the image taken before the displacement) and $c_{m,n}$ represents a pixel value from an M×N comparison frame array (i.e., the image taken after the displacement.) Values i and j represent a shift measured in units of pixels and are spatial indices for correlation $C_{i,j}^k$. Typically, exponent k in Equation 1 is an integer but in principle exponent k can be a real number. In an exemplary embodiment of the N-Cubed process, exponent k is chosen to be equal to two, i.e., k=2, which is an intuitive measure for computing a sum of squared difference between reference frame and comparison frame.

Equation 1:

$$C_{i,j}^k = \sum_{m=1}^{M} \sum_{n=1}^{N} |r_{m,n} - c_{m-i,n-j}|^k$$

Setting k=2, Equation 1 yields Equation 2. Equation 2 includes three terms in the summation: a reference frame energy term, a product term of reference and comparison frames, and an approximate comparison frame energy term. The product $$\text{term} - \sum_{m=1}^{M} \sum_{n=1}^{N} |2 r_{m,n} c_{m-i,n-j}|$$

is negative and determines the outcome of the measurement. Therefore, the N-cubed process for exponent k equal to 2 is essentially a reversed correlation method, where the displacement is at the minimum of the correlation surface.

Equation 2:

$$C_{i,j}^k = \sum_{m=1}^{M} \sum_{n=1}^{N} |r_{m,n} - c_{m-i,n-j}|^2$$

$$= \sum_{m=1}^{M} \sum_{n=1}^{N} |r_{m,n}^2 - 2 r_{m,n} c_{m-i,n-j} + c_{m-i,n-j}^2|$$

The following descriptions of exemplary embodiments of the invention do not use the superscripts 2 in correlations $C_{i,j}^2$. Accordingly, in the following, a correlation $C_{i,j}$ is equal by definition to $C_{i,j}^2$. It should be understood, however, that the described techniques could similarly be implemented using other correlations $C_{i,j}^k$ of the form defined in Equation 1.

A displacement measurement to fractional pixel or subwavelength accuracy can begin with a coarse search for integer shift values i and j that provide the smallest correlation $C_{i,j}$. For the coarse search, an initial search region that defines limits for shift values i and j is selected. For example, the initial search region may be centered on i=j=0 and contain nine integer valued combinations of i and j in a 3×3 search region or 25 integer valued combinations of i and j in a 5×5 region. Correlations $C_{i,j}$ are then calculated for each of combinations of integer shift values i and j in the search region. If a lowest of the calculated correlations $C_{i,j}$ is interior to the search region, meaning at the center of a 3×3 search region or in the central 3×3 region of a 5×5 search region, the search is complete. If the lowest of the calculated correlations $C_{i,j}$ is not inside the search region, i.e., if the minimum correlation $C_{i,j}$ is on a boundary of the search region, the location of the minimum correlation $C_{i,j}$ indicates a direction for extension, re-centering, or reselection of the search region. For example, a search region can be re-centered around that boundary point or can be enlarged in the direction of the minimum correlation $C_{i,j}$. The coarse search continues in this manner until the minimum of correlation $C_{i,j}$ is in the interior of the search region, not on a boundary. However, if the search region is larger than 3×3 when the minimum is within the interior of the search region, a final 3×3 search region can be centered on the minimum correlation $C_{i,j}$ having integer shift indices i and j.

Figure 4:
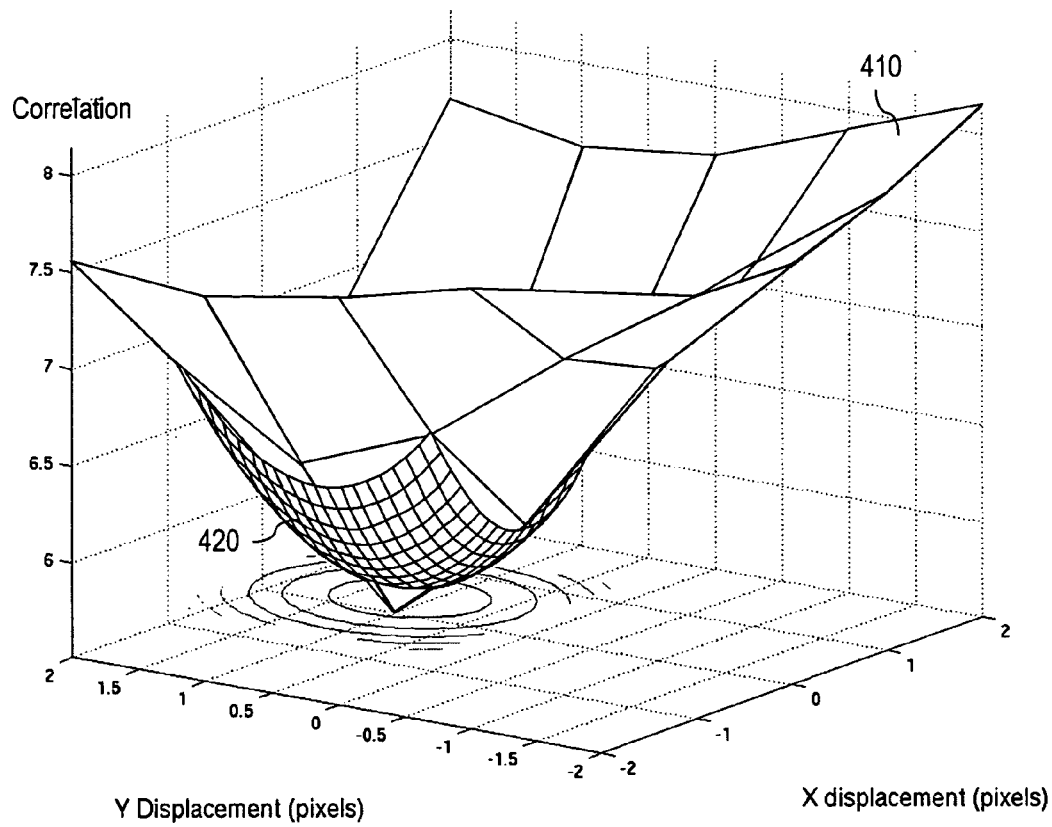
FIG. 4 shows correlation surfaces for illustration of an embodiment of the invention using a nearest neighbor navigation process to measure a displacement.

FIG. 4 shows an example of a polygon approximation of a correlation surface 410 having a minimum correlation $C_{i,j}$ within the interior of a 5×5 search region. Surface 410 can be curve-fitted to a continuous function of a preselected form, e.g., to a Taylor expansion of any desired order, yielding a surface 420. In an exemplary embodiment of the invention, surface 420 is a general second-order surface having the form of Equation 3 and is thus defined by six parameters $a_{00}$, $a_{10}$, $a_{01}$, $a_{20}$, $a_{11}$, and $a_{02}$.

$$f(x,y) = a_{10} + a_{10}x + a_{01}y + a_{20}x^2 + a_{11}xy + a_{02}y^2 \qquad \text{Equation 3:}$$

Parameters $a_{00}$, $a_{10}$, $a_{01}$, $a_{20}$, $a_{11}$, and $a_{02}$ can be determined by applying a conventional fitting process to a set of the calculated correlation values, e.g., nine calculated correlation values $C_{-1,-1}$ to $C_{1,1}$ that are centered on the minima of the correlation surface 410. A purely algebraic approach to determination of parameters $a_{00}$ to $a_{20}$ requires selection among the calculated data points, e.g., among correlation values $C_{-1,-1}$ to $C_{1,1}$ to obtain a solution. Instead, the well-known method of least-squares fitting is identical to the method of maximum likelihood estimation of the fitted parameters if the instrumental and statistical errors in the correlation data are independent and follow the normal distribution. In principle, the correlation data satisfy these assumptions, if care is taken to ensure use of only calibrated pixel intensity measurements, thereby minimizing the impact of systematic errors on the computation of the correlation numbers. With such criteria satisfied, the method of least-squares fitting can therefore be considered to be optimal, from the standpoint of maximum likelihood estimation criteria.

In practice, the errors (which, on the average, should be the same for each correlation cell) may be difficult to determine. Hence, weighting factors that depend on the errors can be neglected in the least square fit, making the squared deviation $\chi^2$ simply the sum of the squared deviations between the correlation values $C_{i,j}$ and the corresponding estimates made using $f(x,y)$ of Equation 3. Equation 4 gives squared deviation $\chi^2$ for the case where nine calculated correlations $C_{-1,-1}$ to $C_{1,1}$ are used without error-based weighting. As shown, squared deviation $\chi^2$ is a nonlinear function of the parameters $a_{00}$ to $a_{20}$ because $f(x, y)$ is a linear function of the parameters $a_{00}$ to $a_{20}$.

Equation 4:

$$\chi^2 = [C_{0,0} - f(0, 0)]^2 + [C_{-1,0} - f(-1, 0)]^2 +$$
$$[C_{-1,-1} - f(-1, 1)]^2 + [C_{0,1} - f(0, 1)]^2 +$$
$$[C_{1,1} - f(1, 1)]^2 + [C_{1,0} - f(1, 0)]^2 +$$
$$[C_{1,-1} - f(1, -1)]^2 + [C_{0,-1} - f(0, -1)]^2 +$$
$$[C_{-1,-1} - f(-1, -1)]^2$$

A numerical fit of $f(x,y)$ to the nine correlation values $C_{-1,-1}$ to $C_{1,1}$ may not be practical in a real-time system, in which case an analytic solution resulting from the least square fit can be used. The analytic solution is based on the fact that the gradient of deviation $\chi_2$ with respect to each of parameters $a_{00}$ to $a_{20}$ must vanish as indicated in Equation 5, at the minimum of deviation $\chi^2$.

Equation 5:

$$\frac{\partial}{\partial a_{i,j}} \chi^2 = 0$$

Equation 5 provides six independent equations relating the six unknown parameters $a_{00}$ to $a_{20}$ to the known correlation values $C_{-1,-1}$ to $C_{1,1}$ allowing an analytic solution for parameters $a_{00}$ to $a_{20}$ in terms of correlation values $C_{-1,-1}$ to $C_{1,1}$. Equations 6 give a solution for parameters $a_{00}$ to $a_{20}$ in terms of nine correlation values $C_{-1,-1}$ to $C_{1,1}$ for the specific case using nine correlation values $C_{-1,-1}$ to $C_{1,1}$ with a minimum near value $C_{0,0}$. Since $\chi^2$ is positive definite by definition, this solution must represent a unique minimum.

Equation 6:

$$\begin{cases} a_{00} = \frac{1}{9}[5C_{0,0} + 2(C_{-1,0} + C_{0,1} + C_{1,0} + C_{0,-1}) - \\ \qquad (C_{-1,1} + C_{1,1} + C_{1,-1} + C_{-1,-1})] \\ a_{10} = \frac{1}{6}[(C_{1,1} + C_{1,0} + C_{1,-1}) - (C_{-1,1} + C_{-1,0} + C_{-1,-1})] \\ a_{01} = \frac{1}{6}[(C_{-1,1} + C_{0,1} + C_{1,1}) - (C_{-1,-1} + C_{0,-1} + C_{1,-1})] \\ a_{11} = \frac{1}{4}[(C_{1,1} + C_{-1,-1}) - (C_{-1,1} + C_{1,-1})] \\ a_{20} = \frac{1}{6}[(C_{-1,-1} + C_{-1,0} + C_{-1,1} + C_{1,-1} + C_{1,0} + C_{1,1}) - \\ \qquad 2(C_{0,-1} + C_{0,0} + C_{0,1})] \\ a_{02} = \frac{1}{6}[(C_{-1,1} + C_{0,1} + C_{1,1} + C_{-1,-1} + C_{0,-1} + C_{1,-1}) - \\ \qquad 2(C_{-1,0} + C_{0,0} + C_{1,0})] \end{cases}$$

The displacement vector corresponds to the coordinates $x_0$ and $y_0$ of the minimum of function $f(x, y)$. The minimum of function $f(x, y)$ is found from the requirement that the gradient of $f(x, y)$ with respect to the x and y equals to zero at point $\{X_0, y_0\}$ as indicated in Equation 7. Applying Equation 7 to a function $f(x, y)$ having parameters given in Equation 6 provides two equations that when solved yield the maximum likelihood displacement results $x_0$ and $y_0$ shown in Equations 8. Accordingly, combining Equations 8 and 6 provides an arithmetic expression for displacements $x_0$ and $y_0$ in terms of correlations $C_{-1,-1}$ to $C_{1,1}$.

Equation 7:

$$\frac{\partial}{\partial x} f(x, y)\Big|_{\{x,y\} \to \{x_0,y_0\}} = \frac{\partial}{\partial y} f(x, y)\Big|_{\{x,y\} \to \{x_0,y_0\}} = 0$$

Equation 8:

$$\begin{cases} x_0 = \frac{a_{01} a_{11} - 2 a_{10} a_{02}}{4 a_{20} a_{02} - a_{11}^2} \\ y_0 = \frac{a_{10} a_{11} - 2 a_{01} a_{20}}{4 a_{20} a_{02} - a_{11}^2} \end{cases}$$

Sub-pixel displacement estimation processes like the N-cubed process described above can achieve extremely high accuracy in most of the applications. In those applications, characteristics of the environment and the object under observation are often well defined and repeatable, and some characteristics of the object are known or can be calibrated. In those situations, a variation of the general N-cubed process can take advantage of prior knowledge to further reduce systematic errors.

One technique for controlling systematic errors relies on the compared and reference images being images of the same object. This allows use of a single reference image to determine the general shape of the continuous correlation surface, e.g., surface 420 in FIG. 4. In particular, the displacement in the analytical form given in Equation 8 has a denominator $4a_{20}a_{02} - a_{11}^2$, which depends on the shape of the continuous correlation surface but not the location of the correlation surface. Denominator $4a_{20}a_{02-a11}^2$ can be determined from a autocorrelation of the reference frame, and then held fixed for subsequent comparison frames. More specifically, base displacements $x_{OB}$ and $y_{OB}$ can be determined using Equations 8 with the denominator $4a_{20}a_{02-a11}^2$ held at the value determined from the auto-correlation of the reference image.

The base displacements $x_{OB}$ and $y_{OB}$ are expected to contain more error than displacements $x_0$ and $y_0$ determined when denominator $4a_{20}a_{02} - a_{11}^2$ depends on the measurement. However, base displacements $x_{OB}$ and $y_{OB}$ depend linearly on the nine correlation values $C_{-1,-1}$ to $C_{1,1}$ through the parameters $a_{10 \text{ to } a01}$, so that the errors are expected to be linear in the computed values of displacements $x_{OB}$ and $y_{OB}$. Consequently, correction functions $\Delta x(x_0, y_0)$ and $\Delta y(x_0, y_0)$, which are linear in displacements $x_{OB}$ and $y_{OB}$ can be found, for example, by calibrated movement of the object. Equation 9 gives correction functions $\Delta x(x_0, y_0)$ and $\Delta y(x_0, y_0)$, where $p_{00}$, $p_{10}$, and $p_{01}$ are determined parameters. As indicated in Equation 10, correction functions $\Delta x(x_0, y_0)$ and $\Delta y(x_0, y_0)$ can be applied after base displacements $x_{OB}$ and $y_{OB}$ have been computed to provide more accurate measurements of displacements $x_0$ and $y_0$.

Equation 9:

$$\Delta x(x_0, y_0) = p_{00} + p_{10} x_{OB} + p_{01} y_{OB}$$
$$\Delta y(x_0, y_0) = q_{00} + q_{10} x_{OB} + q_{01} y_{OB}$$

-continued

Equations 10:

$$\begin{cases} x_0 \Rightarrow x_{0B} - \Delta x(x_0, y_0) \\ y_0 \Rightarrow y_{0B} - \Delta y(x_0, y_0) \end{cases}$$

Although the invention has been described with reference to particular embodiments, the description is only an example of the invention's application and should not be taken as a limitation. For example, above-described embodiments of the invention can employ an NDSE process with sub-wavelength accuracies, and in a typical application, the translations which are to be quantified are 2-dimensional, for example within a 2-dimensional plane (x,y). However, the concepts described herein are extensible to any dimension. Further, although the above description has concentrated on images captured using optical techniques, any other imaging process could similarly provide displaced images or data for analysis. Various other adaptations and combinations of features of the embodiments disclosed are within the scope of the invention as defined by the following claims.

What is claimed is:

1. A method for measuring a displacement of an object, comprising:
   capturing a first image of the object;
   capturing a second image of the object after a displacement;
   generating correlation data representing a relationship between the first image and the second image;
   fitting a continuous function to the correlation data; and
   identifying a location of an extremum of the continuous function, wherein the location indicates the displacement to accuracy less than a wavelength of light used to capture the images.

2. The method of claim 1, wherein the object comprises a structure formed during manufacture of a nanometer-scale device.

3. The method of claim 1, wherein the displacement results from movement of the object.

4. The method of claim 1, wherein the displacement results from movement of a system that captures the first and second images.

5. The method of claim 1, wherein generating the correlation data comprises calculating correlation values $C_{i,j}^k$ satisfying the relation $$C_{i,j}^k = \sum_{m=1}^{M} \sum_{n=1}^{N} |r_{m,n} - c_{m-i,n-j}|^k,$$

where $r_{m,n}$ represents a pixel value from the M×N array representing the first image, $c_{m,n}$ represents a pixel value from a M×N array representing the second image, k is a non-zero number, and i and j are spatial indices for the correlation value $C_{i,j}^k$.

6. The method of claim 1, wherein fitting the continuous function to the correlation data comprises fitting a general second-order function of spatial indices of the correlation data.

7. The method of claim 1, wherein the accuracy of the measurement is less than about 10 nm.

8. A system comprising:
   an image capture system configured to capture images of an object; and
   a processing system coupled to receive image data from the image capture system, wherein the processing system implements a measurement process that functions to:
   generate correlation data representing a relationship between a first image of an object captured by the image capture system and a second image of the object captured by the image capture system after a displacement;
   fit a continuous function to the correlation data; and
   identify a location of an extremum of the continuous functions, wherein the location indicates the displacement to accuracy less than a wavelength of light used to capture the images.

9. The system of claim 8, wherein the object comprises a structure formed during manufacture of a nanometer-scale device.

10. The system of claim 8, wherein the accuracy of the measurement is less than about 10 nm.

11. A system comprising:
    means for capturing a first image of the object and a second image of the object after a displacement;
    means for generating correlation data representing a relationship between the first image and the second image;
    means for fitting a continuous function to the correlation data; and
    means for identifying a location of an extremum of the continuous function, wherein the location indicates the displacement to accuracy less than a wavelength of light used to capture the images.

12. A computer-readable storage medium containing a set of instructions comprising:
    a routine for generating correlation data representing a relationship between a first image of an object and a second image of the object after a displacement;
    a routine for fitting a continuous function to the correlation data; and
    a routine for identifying a location of an extremum of the continuous function, wherein the location indicates the displacement to accuracy less than a wavelength of light used to capture the images.

* * * * *